(12) United States Patent
Xiao et al.

(10) Patent No.: US 9,104,854 B2
(45) Date of Patent: Aug. 11, 2015

(54) METHOD AND APPARATUS USING A CAPTCHA HAVING VISUAL INFORMATION RELATED TO THE CAPTCHA'S SOURCE

(75) Inventors: Lu Xiao, San Diego, CA (US); Alexander Gantman, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 13/211,818

(22) Filed: Aug. 17, 2011

(65) Prior Publication Data

US 2013/0047231 A1 Feb. 21, 2013

(51) Int. Cl.
*G06F 21/00* (2013.01)
*G06F 21/36* (2013.01)

(52) U.S. Cl.
CPC ........ *G06F 21/36* (2013.01); *G06F 2221/2133* (2013.01)

(58) Field of Classification Search
USPC .............................................................. 726/7
See application file for complete search history.

(56) References Cited

U.S. PATENT DOCUMENTS

| 7,200,576 | B2 | 4/2007 | Steeves et al. | |
|---|---|---|---|---|
| 2007/0043681 | A1 | 2/2007 | Morgan et al. | |
| 2008/0072293 | A1* | 3/2008 | D'Urso | 726/4 |
| 2008/0109657 | A1 | 5/2008 | Bajaj et al. | |
| 2008/0209223 | A1 | 8/2008 | Nandy et al. | |
| 2009/0049301 | A1 | 2/2009 | Hamid et al. | |
| 2009/0204819 | A1* | 8/2009 | Parker | 713/182 |
| 2012/0272302 | A1* | 10/2012 | Zhu et al. | 726/6 |

FOREIGN PATENT DOCUMENTS

| JP | 2010067096 | * | 3/2010 |
|---|---|---|---|
| JP | 2010067096 | A | 3/2010 |
| JP | 2011048497 | * | 3/2011 |
| JP | 2011048497 | A | 3/2011 |
| WO | 2008030363 | A2 | 3/2008 |

OTHER PUBLICATIONS

"Picture CAPTCHAs With Sequencing: Their Types and Analysis", Aditya Raj, Ashish Jain, Tushar Pahwa and Abhimanyu Jain, International Journal of Digital Society, vol. 1, Issue 3, Sep. 2010, pp. 208-220.*
Fischer et al., "Watermarks and Text Transformations in Visual Document Authentication", Journal of Computers, vol. 2, No. 5, Jul. 2007, pp. 44-53.
International Search Report and Written Opinion—PCT/US2012/051355—ISA/EPO—Nov. 27, 2012.

* cited by examiner

*Primary Examiner* — Joseph P Hirl
*Assistant Examiner* — Chi Nguy
(74) *Attorney, Agent, or Firm* — Won Tae C. Kim

(57) ABSTRACT

Disclosed is a method for visual verification a Captcha's source. In the method, a Captcha is served to a user. The Captcha includes visual information related to a characteristic of a source of the Captcha and related to a puzzle question of the Captcha. The visual information is for visual verification by the user of the Captcha's source. A response is received from the user based on the served Captcha. A determination is made as to whether the received response is a solution of the puzzle question of the served Captcha.

40 Claims, 4 Drawing Sheets

METHOD AND APPARATUS USING A CAPTCHA HAVING VISUAL INFORMATION RELATED TO THE CAPTCHA'S SOURCE

BACKGROUND

1. Field

The present invention relates generally to using a Captcha having visual information related to a source of the Captcha.

2. Background

A Captcha (also referred to as CAPTCHA—Completely Automated Public Turing test to tell Computers and Humans Apart) is a challenge and response test which ensures that the response to a challenge is from a human user instead of from a computer. A Captcha is designed so that it is relatively easy for a human user to recognize distorted characters of the challenge, but it is very hard for pattern recognition software to extract and recognize the distorted characters. Captchas have been widely used in servers to frustrate automated traffic.

A Captcha may be subject to a type of relay attack. To launch a relay attack, a hacker sets up a website which interests many innocent users using either legal or illegal content. Whenever the hacker needs to return a Captcha response to, for example, XYZ Bank, the hacker forwards the Captcha challenge received from a server for the XYZ Bank to an innocent user of hacker's website, which website, of course, is not associated with the XYZ Bank. Not knowing the source of the Captcha, the innocent user may respond to the Captcha challenge, and may be unwittingly involved in the hacker's online fraud.

There is therefore a need for a technique for providing Captcha source information to a user in a manner that may allow a user to avoid unwittingly being involved in online fraud.

SUMMARY

An aspect of the invention may reside in a method that allows for visual verification a Captcha's source. In the method, a Captcha is served to a user. The Captcha includes visual information related to a characteristic of a source of the Captcha and related to a puzzle question of the Captcha. The visual information is for visual verification by the user of the Captcha's source. A response is received from the user based on the served Captcha. A determination is made as to whether the received response is a solution of the puzzle question of the served Captcha.

In more detailed aspects of the invention, the characteristic may be a name associated with the Captcha's source, or a name associated with a server serving the Captcha. A solution of the puzzle question may comprise numbers closest to characters of the name. The puzzle question may be based on a distance in the visual information. The puzzle question may be further based on colors in the visual information. The visual information may be embedded in the Captcha.

Another aspect of the invention may reside in a station, comprising: means for serving a Captcha to a user, wherein the Captcha includes visual information related to a characteristic of a source of the Captcha and related to a puzzle question of the Captcha, and wherein the visual information is for visual verification by the user of the Captcha's source; means for receiving a response from the user based on the served Captcha; and means for determining whether the received response is a solution of the puzzle question of the served Captcha.

Another aspect of the invention may reside in a station comprising a processor configured to: serve a Captcha to a user, wherein the Captcha includes visual information related to a characteristic of a source of the Captcha and related to a puzzle question of the Captcha, and wherein the visual information is for visual verification by the user of the Captcha's source; receive a response from the user based on the served Captcha; and determine whether the received response is a solution of the puzzle question of the served Captcha.

Another aspect of the invention may reside in a computer program product comprising computer-readable medium, comprising: code for causing a computer to serve a Captcha to a user, wherein the Captcha includes visual information related to a characteristic of a source of the Captcha and related to a puzzle question of the Captcha, and wherein the visual information is for visual verification by the user of the Captcha's source; code for causing a computer to receive a response from the user based on the served Captcha; and code for causing a computer to determine whether the received response is a solution of the puzzle question of the served Captcha.

Yet another aspect of the invention may reside in a method that allows for visual verification a Captcha's source. In the method, a Captcha is displayed to a user. The Captcha includes visual information related to a characteristic of a source of the Captcha and related to a puzzle question of the Captcha. A response is received from the user based on visual verification by the user of the Captcha's source using the Captcha. The response is sent to a server for determination of to whether the received response is a solution of the puzzle question of the Captcha.

Another aspect of the invention may reside in a station, comprising: means for displaying a Captcha to a user, wherein the Captcha includes visual information related to a characteristic of a source of the Captcha and related to a puzzle question of the Captcha; means for receiving a response from the user based on visual verification by the user of the Captcha's source using the Captcha; and means for sending the response to a server for determination of whether the received response is a solution of the puzzle question of the Captcha.

Another aspect of the invention may reside in a station comprising: a display configured to display a Captcha to a user, wherein the Captcha includes visual information related to a characteristic of a source of the Captcha and related to a puzzle question of the Captcha; and a processor configured to: receive a response from the user based on visual verification by the user of the Captcha's source using the Captcha, and send the response to a server for determination of whether the received response is a solution of the puzzle question of the Captcha.

Another aspect of the invention may reside in a computer program product comprising computer-readable medium, comprising: code for causing a computer to display a Captcha to a user, wherein the Captcha includes visual information related to a characteristic of a source of the Captcha and related to a puzzle question of the Captcha; code for causing a computer to receive a response from the user based on visual verification by the user of the Captcha's source using the Captcha; and code for causing a computer to send the response to a server for determination of whether the received response is a solution of the puzzle question of the Captcha.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
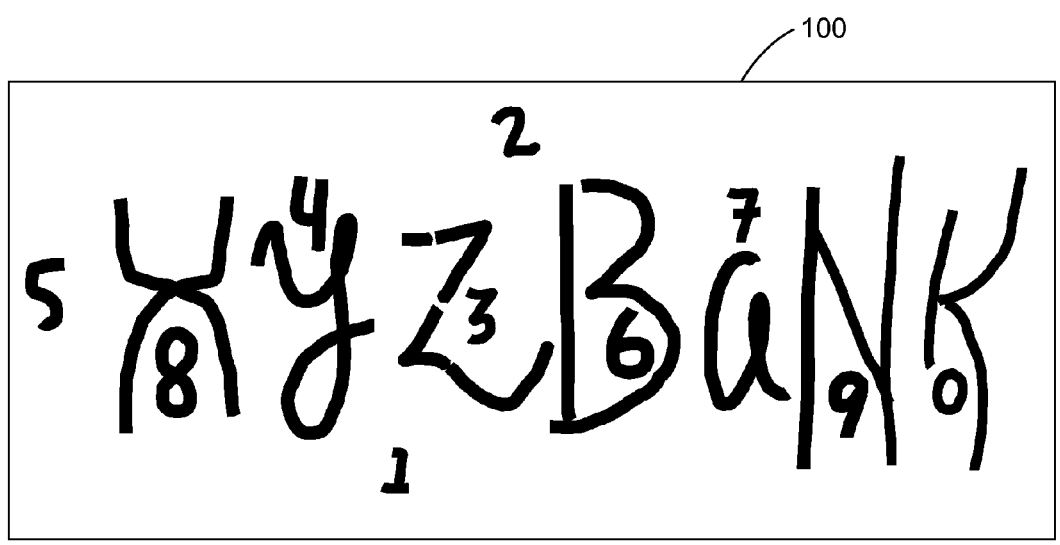
FIG. 1 is an image of an example of a Captcha having visual information related to a characteristic of a source and related to a puzzle question of the Captcha, according to the present invention.
Figure 2:
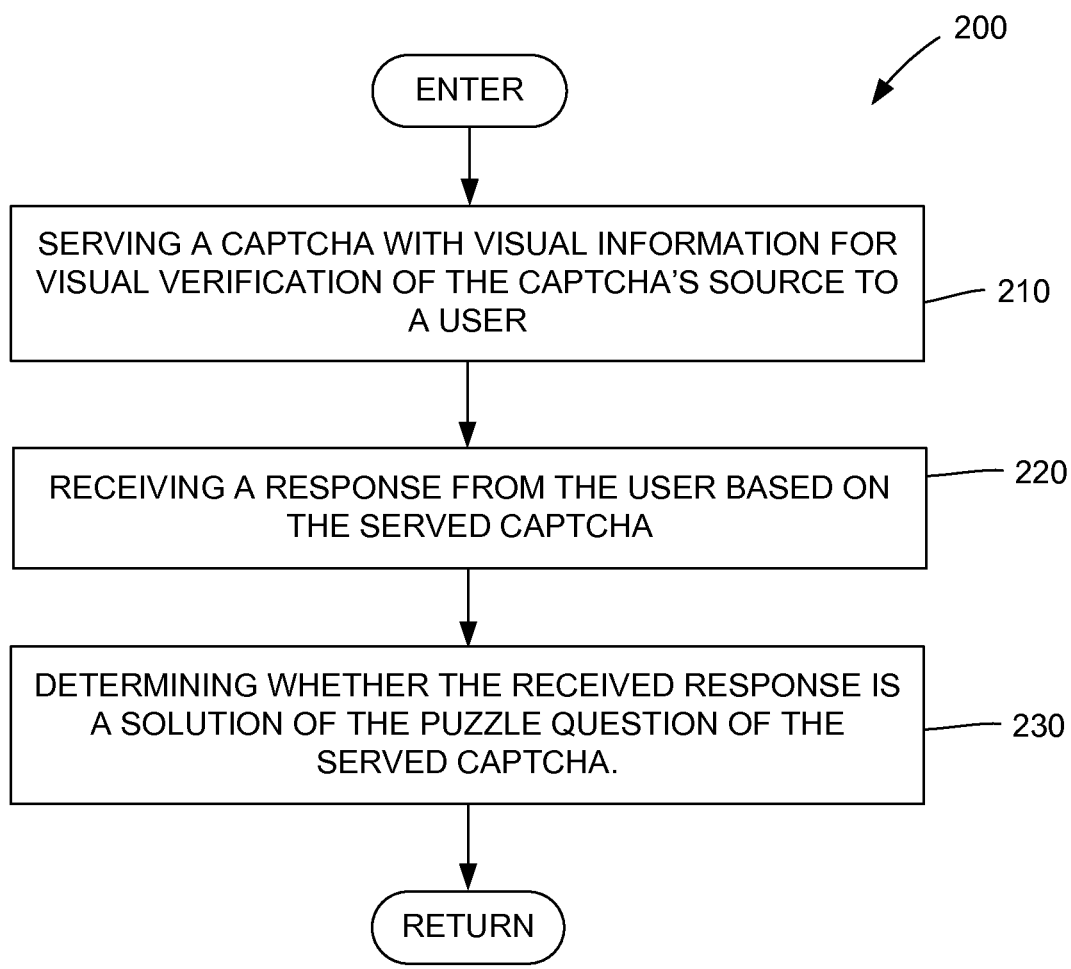
FIG. 2 is a flow diagram of a server method using a Captcha with visual information for visual verification by the user of the Captcha's source, according to the present invention.
Figure 3:
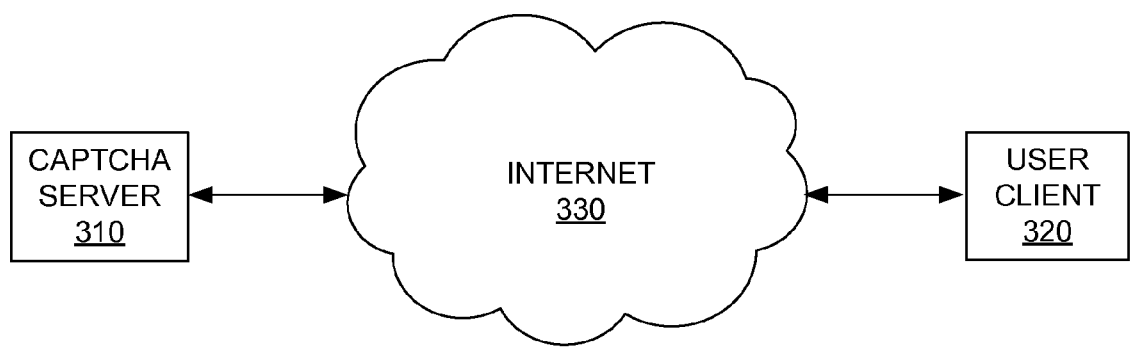
FIG. 3 is a block diagram showing a Captcha server and a user client.

With reference to FIGS. 1-3, an aspect of the invention may reside in a method 200 using visual information for visual verification a Captcha's source. In the method, a Captcha 100 is served to a user by, for example, a Captcha server 310 (step 210). A user client 320 display's the Captcha to the user. The Captcha includes visual information related to a characteristic of a source (e.g., XYZ Bank) of the Captcha and related to a puzzle question of the Captcha. The visual information is for visual verification by the user of the Captcha's source. A response is received from the user based on the served Captcha (step 220). A determination is made as to whether the received response is a solution of the puzzle question of the served Captcha (step 230).

In more detailed aspects of the invention, the characteristic may be a name (e.g., XYZ Bank) associated with the Captcha's source, or a name associated with a server serving the Captcha 100 (e.g., a URL of the Captcha server 310). A solution of the puzzle question may comprise numbers closest to characters of the name. The puzzle question may be based on a distance in the visual information. The puzzle question may be further based on colors in the visual information. The visual information may be embedded in the Captcha.

The user is assisted by the addition of visual information related to a Captcha's source to the puzzle image. The visual information allows a user to see the real source of the Captcha. When a relay attack is launched, an innocent user may be able detect the fraud and refuse to provide a response of the Captcha based on the visual information. The visual source information should be difficult to remove from the puzzle image, but easy for a user to recognize. This may be accomplished by using the source information as a reference for solving the Captcha's puzzle question during human character recognition by the user.

As shown in FIG. 1, the Captcha server 310 may provide (or generate) a typical Captcha puzzle image which contains distorted letters/characters of the Captcha's source, e.g., "XYZ Bank." Case sensitivity may be ignored. The Captcha server adds characters, such as numbers, to the puzzle image. The added numbers may have an appearance of random placement. The server sends the puzzle to the user and asks the user to send back the number closest to each letter. The user verifies the source information by comparing the visual source information in the puzzle with the server's identifier. If they match, the user finds the number closest to each letter and sends the numbers back to the server. In the example, the solution to the puzzle question is "8436790" which are the numbers closest to each letter of "XYZ Bank" in the puzzle image.

Therefore, if the source information is removed from the Captcha, the puzzle response would not be correct, or the puzzle question would no longer exist. Without the source information, a user may be confused by the puzzle question. Further, if the actual source information is replaced by "fake" information, e.g., "XYZ Bank" is replaced by "MpegBBS," then the response based on the fake information may not be correct.

The visual bonding between the source information and the Captcha puzzle image to prevent source fraud involving an unwitting user extends the technology concepts used by a Captcha for frustrating computer automated character recognition. The visual source information scheme of the invention may provide a reasonably strong gain in frustrating problematic traffic by applying the visual bonding.

In addition to the distance, the source information may have other characteristics. For example, a unique color or fill pattern can be assigned to each challenge character associated with the source information. In addition, a character may have segmented colors. For example, in FIG. 1, the letter "Z" has four (4) segments. The color of each segment may be different, or the color of each segment may alternate between two colors. Also, the colors of the added numbers may be different, and the puzzle question may further or alternatively relate to matching the color of challenge characters with the colors of the added numbers.

Figure 4:
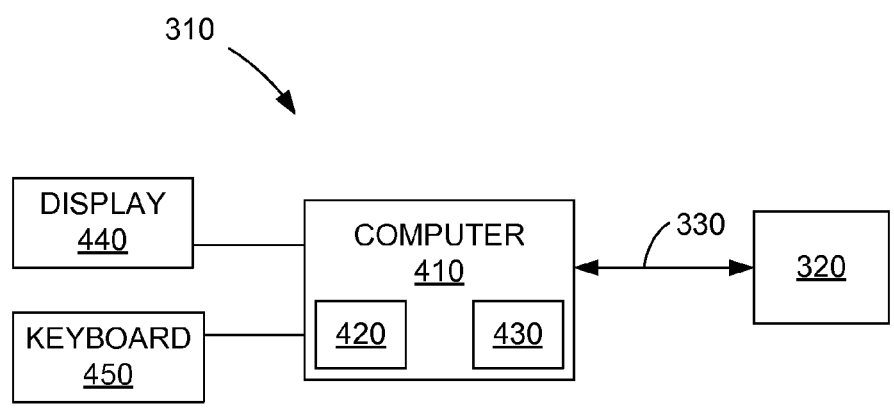
FIG. 4 is a block diagram showing an example of a computer for implementing the Captcha server.
Figure 5:
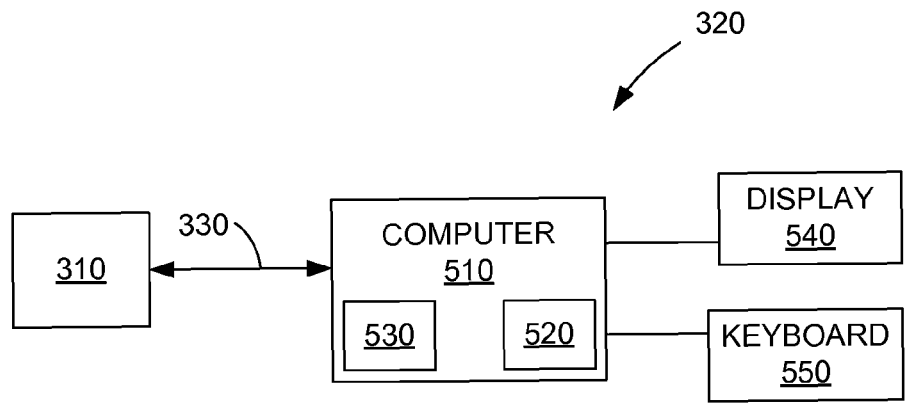
FIG. 5 is a block diagram showing an example of a computer for implementing the user client.
Figure 6:
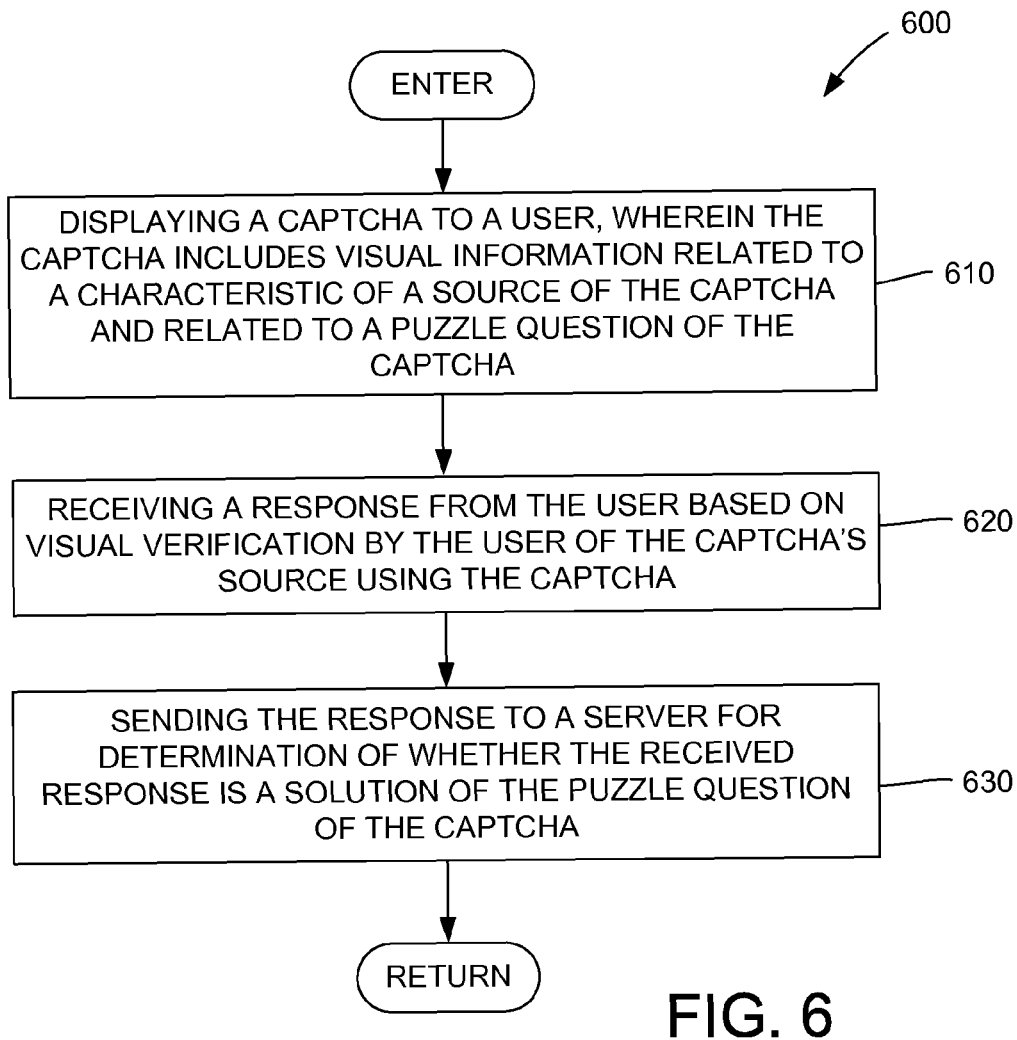
FIG. 6 is a flow diagram of a client method using a Captcha with visual information for visual verification by the user of the Captcha's source, according to the present invention.

With additional reference to FIGS. 4 and 5, a station comprising the Captcha server 310 may be a computer 410 that includes a processor 420, memory 430 (and/or disk drives), a display 440, and keypad or keyboard 450. Similarly, another station comprising the user client 320 may be a computer 510 that includes a processor 520, memory 530 (and/or disk drives), a display 540, and keypad or keyboard 550. The user client computer may also include a microphone, speaker(s), camera, and the like. Further, the stations may also include USB, Ethernet and similar interfaces, for communicating over a network, such as the internet 330.

Another aspect of the invention may reside in a station, such as the Captcha server 310, comprising: means 420 for serving a Captcha 100 to a user, wherein the Captcha includes visual information related to a characteristic of a source of the Captcha and related to a puzzle question of the Captcha, and wherein the visual information is for visual verification by the user of the Captcha's source; means 420 for receiving a response from the user based on the served Captcha; and means 420 for determining whether the received response is a solution of the puzzle question of the served Captcha.

Another aspect of the invention may reside in a station comprising a processor 420 configured to: serve a Captcha 100 to a user, wherein the Captcha includes visual information related to a characteristic of a source of the Captcha and related to a puzzle question of the Captcha, and wherein the visual information is for visual verification by the user of the Captcha's source; receive a response from the user based on the served Captcha; and determine whether the received response is a solution of the puzzle question of the served Captcha.

Another aspect of the invention may reside in a computer program product comprising non-transitory computer-readable medium 430, comprising: code for causing a computer 410 to serve a Captcha 100 to a user, wherein the captcha includes visual information related to a characteristic of a source of the Captcha and related to a puzzle question of the Captcha, and wherein the visual information is for visual verification by the user of the Captcha's source; code for causing a computer 410 to receive a response from the user based on the served Captcha; and code for causing a computer 410 to determine whether the received response is a solution of the puzzle question of the served Captcha.

Yet another aspect of the invention may reside in a method 600 that allows for visual verification a Captcha's source. In the method, a Captcha 100 is displayed to a user by a user client 320 (step 610). The Captcha includes visual information related to a characteristic of a source of the Captcha and related to a puzzle question of the Captcha. A response is received from the user based on visual verification by the user of the Captcha's source using the Captcha (step 620). The response is sent to a server 310 for determination of to whether the received response is a solution of the puzzle question of the Captcha (step 630).

Another aspect of the invention may reside in a station, such as the user client 320, comprising: means 520 for displaying a Captcha to a user, wherein the Captcha includes visual information related to a characteristic of a source of the Captcha and related to a puzzle question of the Captcha; means 520 for receiving a response from the user based on visual verification by the user of the Captcha's source using the Captcha; and means 520 for sending the response to a server 310 for determination of whether the received response is a solution of the puzzle question of the Captcha.

Another aspect of the invention may reside in a station comprising: a display 540 configured to display a Captcha 100 to a user, wherein the Captcha includes visual information related to a characteristic of a source of the Captcha and related to a puzzle question of the Captcha; and a processor 520 configured to: receive a response from the user based on visual verification by the user of the Captcha's source using the Captcha, and send the response to a server 310 for determination of whether the received response is a solution of the puzzle question of the Captcha.

Another aspect of the invention may reside in a computer program product comprising computer-readable medium 530, comprising: code for causing a computer 510 to display a Captcha to a user, wherein the Captcha includes visual information related to a characteristic of a source of the Captcha and related to a puzzle question of the Captcha; code for causing a computer 510 to receive a response from the user based on visual verification by the user of the Captcha's source using the Captcha; and code for causing a computer 510 to send the response to a server 310 for determination of whether the received response is a solution of the puzzle question of the Captcha.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on as one or more instructions or code on a computer-readable medium. Computer-readable media includes computer storage media that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer-readable medium may be non-transitory such that it does not include a transitory, propagating signal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method, comprising:

serving a Captcha to a user, wherein the Captcha includes visual information of numbers and letters associated with a source of the Captcha and related to a puzzle question of the Captcha, wherein the puzzle question is related to the Captcha's source, and wherein the numbers and the letters are for visual verification by the user of the Captcha's source;

receiving a response from the user based on the served Captcha; and determining whether the received response is a solution of the puzzle question of the served Captcha, wherein the solution of the puzzle question comprises the numbers that are a closest distance to the letters, and wherein a number of the numbers is not equal to a number of the letters in the Captcha.

2. The method of claim 1, wherein the letters comprise a name associated with the Captcha's source.

3. The method of claim 1, wherein the puzzle question is further based on colors in the Captcha.

4. The method of claim 1, wherein the letters comprise a name associated with a server serving the Captcha.

5. The method of claim 1, wherein the letters associated with the source of the Captcha and related to a puzzle question of the Captcha is a reference for solving the puzzle question.

6. The method of claim 1, wherein the Captcha's source is a reference for solving the Captcha's puzzle question.

7. The method of claim 1, wherein removal from the Captcha of the letters removes the puzzle question from the Captcha.

8. The method of claim 1, wherein the number of the numbers is greater than the number of the letters in the Captcha.

9. A station, comprising:

means for serving a Captcha to a user, wherein the Captcha includes visual information of numbers and letters associated with a source of the Captcha and related to a puzzle question of the Captcha, wherein the puzzle question is related to the Captcha's source, and wherein the numbers and the letters are for visual verification by the user of the Captcha's source;

means for receiving a response from the user based on the served Captcha; and means for determining whether the received response is a solution of the puzzle question of the served Captcha, wherein the solution of the puzzle question comprises the numbers that are a closest distance to the letters, and wherein a number of the numbers is not equal to a number of the letters in the Captcha.

10. The station of claim 9, wherein the letters comprise a name associated with the Captcha's source.

11. The station of claim 9, wherein the puzzle question is further based on colors in the Captcha.

12. The station of claim 9, wherein the letters comprise a name associated with a server serving the Captcha.

13. A station, comprising:

a processor configured to:

serve a Captcha to a user, wherein the Captcha includes visual information of numbers and letters associated with a source of the Captcha and related to a puzzle question of the Captcha, wherein the puzzle question is related to the Captcha's source, and wherein the numbers and the letters are for visual verification by the user of the Captcha's source;

receive a response from the user based on the served Captcha; and determine whether the received response is a solution of the puzzle question of the served Captcha, wherein the solution of the puzzle question comprises the numbers that are a closest distance to the letters, and wherein a number of the numbers is not equal to a number of the letters in the Captcha.

14. The station of claim 13, wherein the letters comprise a name associated with the Captcha's source.

15. The station of as claim 13, wherein the puzzle question is further based on colors in the Captcha.

16. The station of claim 13, wherein the letters comprise a name associated with a server serving the Captcha.

17. A computer program product, comprising:

a non-transitory computer-readable medium, comprising:

code for causing a computer to serve a Captcha to a user, wherein the Captcha includes visual information of numbers and letters associated with a source of the Captcha and related to a puzzle question of the Captcha, wherein the puzzle question is related to the Captcha's source, and wherein the numbers and the letters are for visual verification by the user of the Captcha's source;

code for causing the computer to receive a response from the user based on the served Captcha; and code for causing the computer to determine whether the received response is a solution of the puzzle question of the served captcha, wherein the solution of the puzzle question comprises the numbers that are a closest distance to the letters, and wherein a number of the numbers is not equal to a number of the letters in the Captcha.

18. The computer program product of claim 17, wherein the letters comprise a name associated with the Captcha's source.

19. The computer program product of claim 17, wherein the puzzle question is further based on colors in the Captcha.

20. The computer program product of claim 17, wherein the letters comprise a name associated with a server serving the Captcha.

21. A method, comprising:

displaying a Captcha to a user, wherein the Captcha includes visual information of numbers and letters associated with a source of the Captcha and related to a puzzle question of the Captcha, and wherein the puzzle question is related to the Captcha's source;

receiving a response from the user based on visual verification by the user of the Captcha's source using the Captcha; and sending the response to a server for determination of whether the received response is a solution of the puzzle question of the Captcha, wherein the solution of the puzzle question comprises the numbers that are a closest distance to the letters, and wherein a number of the numbers is not equal to a number of the letters in the Captcha.

22. The method of claim 21, wherein the letters comprise a name associated with the Captcha's source.

23. The method of as claim 21, wherein the puzzle question is further based on colors in the Captcha.

24. The method of claim 21, wherein the letters comprise a name associated with a server serving the Captcha.

25. The method of claim 21, wherein letters associated with the source of the Captcha and related to a puzzle question of the Captcha is a reference for solving the puzzle question.

26. The method of claim 21, wherein the Captcha's source is a reference for solving the Captcha's puzzle question.

27. The method of claim 21, wherein removal from the Captcha of the letters removes the puzzle question from the Captcha.

28. The method of claim 21, wherein the number of numbers is greater than the number of the letters in the Captcha.

29. A station, comprising:
- means for displaying a Captcha to a user, wherein the Captcha includes visual information of numbers and letters associated with a source of the Captcha and related to a puzzle question of the Captcha, and wherein the puzzle question is related to the Captcha's source;
- means for receiving a response from the user based on visual verification by the user of the Captcha's source using the Captcha; and
- means for sending the response to a server for determination of whether the received response is a solution of the puzzle question of the Captcha, wherein the solution of the puzzle question comprises the numbers that are a closest distance to the letters, and wherein a number of the numbers is not equal to a number of the letters in the Captcha.

30. The station of claim 29, wherein the letters comprise a name associated with the Captcha's source.

31. The station of claim 29, wherein the puzzle question is further based on colors in the Captcha.

32. The station of claim 29, wherein the letters comprise a name associated with a server serving the Captcha.

33. A station, comprising:
- a display configured to display a Captcha to a user, wherein the Captcha includes visual information of numbers and letters associated with a source of the Captcha and related to a puzzle question of the Captcha, and wherein the puzzle question is related to the Captcha's source; and
- a processor configured to:
    - receive a response from the user based on visual verification by the user of the Captcha's source using the Captcha; and
    - send the response to a server for determination of whether the received response is a solution of the puzzle question of the Captcha, wherein the solution of the puzzle question comprises the numbers that are a closest distance to the letters, and wherein a number of the numbers is not equal to a number of the letters in the Captcha.

34. The station of claim 33, wherein the letters comprise a name associated with the Captcha's source.

35. The station of claim 33, wherein the puzzle question is further based on colors in the Captcha.

36. The station of claim 33, wherein the letters comprise a name associated with a server serving the Captcha.

37. A computer program product, comprising:
- a non-transitory computer-readable medium, comprising:
    - code for causing a computer to display a Captcha to a user, wherein the Captcha includes visual information of numbers and letters associated with a source of the Captcha and related to a puzzle question of the Captcha, and wherein the puzzle question is related to the Captcha's source;
    - code for causing the computer to receive a response from the user based on visual verification by the user of the Captcha's source using the Captcha; and
    - code for causing the computer to send the response to a server for determination of whether the received response is a solution of the puzzle question of the Captcha, wherein the solution of the puzzle question comprises the numbers that are a closest distance to the letters, and wherein a number of the numbers is not equal to a number of the letters in the Captcha.

38. The computer program product of claim 37, wherein the letters comprise a name associated with the Captcha's source.

39. The computer program product of claim 37, wherein the puzzle question is further based on colors in the Captcha.

40. The computer program product of claim 37, wherein the letters comprise a name associated with a server serving the Captcha.

* * * * *